United States Patent [19]

Reinertsen

[11] 3,845,958
[45] Nov. 5, 1974

[54] LETTERS AND NUMBERS GAME
[75] Inventor: Tormod K. Reinertsen, East Northport, N.Y.
[73] Assignee: Ideal Toy Corporation, Hollis, N.Y.
[22] Filed: Feb. 8, 1973
[21] Appl. No.: 330,834

[52] U.S. Cl. ............. 273/135 D, 35/22 A, 35/31 A, 35/31 D, 35/31 G, 35/35 H, 35/70, 221/232, 273/135 R, 273/136 E, 273/144 R
[51] Int. Cl. ......................................... A63f 3/00
[58] Field of Search ............ 273/144 R, 144 A, 135, 273/136 E; 35/31 D, 31 F, 31 G, 35 H, 22 A, 70, 74, 31 A; 221/232

[56] References Cited
UNITED STATES PATENTS

| 1,061,999 | 5/1913 | Grondahl | 273/135 B |
|---|---|---|---|
| 1,471,437 | 10/1923 | Wood | 35/72 |
| 1,698,780 | 1/1929 | Darrow | 273/136 E |
| 2,003,979 | 6/1935 | Škorić | 273/144 A |
| 2,274,051 | 2/1942 | Feltman | 221/232 |
| 2,340,894 | 2/1944 | Morrell | 221/232 |
| 2,493,616 | 1/1950 | Burns | 221/232 X |
| 2,564,976 | 8/1951 | Hooper | 35/31 D |
| 2,657,059 | 10/1953 | Selig | 273/144 R |
| 2,889,961 | 6/1959 | Belmonte | 921/175 |
| 2,979,230 | 4/1961 | Calverley | 273/144 R X |

Primary Examiner—Paul E. Shapiro
Attorney, Agent, or Firm—Richard M. Rabkin

[57] ABSTRACT

A toy for use in teaching children basic letters and numbers concepts includes a plurality of character disks having distinct characters, letters, or numbers formed thereon for cooperation with complementary characters or the like formed on character trays included with the toy. In addition, a device is provided which includes a housing having disk storage and dispensing stations, with a ramp at the storage station for supporting a plurality of the individual character disks in an aligned stack and a pusher to urge the discs towards the dispensing station. A dispensing plate is mounted for reciprocal movement at the dispensing station for removing individual disks from the stack and discharging them from the toy's housing. A spring biased member is located on the opposite side of the dispensing plate to counteract the biasing force of the pusher when the dispensing plate is operated to remove the endmost disc in the stack from the housing. The child then takes the dispensed disk and places it on the appropriate character tray. The discs are of unit thickness and the number characters are formed as apertures in the discs. The number character trays have the numbers formed in relief, each number being of a height equal to the number of unit thickness discs necessary to equal that number.

17 Claims, 6 Drawing Figures

LETTERS AND NUMBERS GAME

The present invention relates to an educational toy and in particular to a toy which will teach a child elementary spelling and numbers concepts.

A large variety of educational toys or devices have been previously proposed for use in teaching a small child of kindergarten or pre-school age basic spelling and numbers concepts. The present invention encompasses a game which is intended for the same purpose, but is one which not only teaches a child letters, basic spelling and numbers concepts, but also provides a high degree of interest and amusement to a child at the same time. This is accomplished by the use of chips or disks having letter or number characters formed thereon which are randomly arranged and serially dispensed and then matched by the child to letters and numbers on associated trays. The apparent random dispensing of the character disks or chips and the association of the disks with the numbers and letters on the trays teaches the child the meanings and concepts related to the letters and numbers.

Accordingly, it is an object of the present invention to provide a combination educational toy which is useful in teaching letters and numbers concepts to small children.

It is another object of the present invention to apparently randomly dispense individual letter or number character disks to a child and to cause the child to match the character on the disk with a character on an associated tray, representative of a letter, word, or number, so as to teach the child the meaning or use of the character on the disk.

Yet another object of the present invention is to provide a relatively simple and inexpensively manufactured toy which is useful in teaching children basic letters and numbers concepts.

A still further object of the present invention is to provide an educational toy which is durable in construction and relatively simple to manufacture.

In accordance with one aspect of the present invention, an educational toy is provided which is adapted to store and serially dispense randomly arrayed individual character containing disks. The main component of the toy includes a frame or housing having a disk storage station and a disk dispensing station located therein. The disk storage station in the housing includes a storage ramp which is adapted to support a plurality of individual character disks or chips in an aligned stack in a generally horizontal position. A pusher is slidably mounted on the ramp and is biased into engagement with one end of the stack of disks to urge the disks towards the dispensing station of the housing. A disk dispensing plate is located at the dispensing station for selectively removing the forwardmost disk in the stack from the housing. In one embodiment of the present invention, this dispensing plate has one side thereof formed in the configuration of a figurine, animal or the like, in order to stimulate interest in the child playing with the game.

In one embodiment of the invention the character disks which are dispensed from the housing have recesses formed therein in the shape of letters which are complementary to, and adapted to received, raised letters on character trays provided with the toy. In another embodiment of the invention the character disks include apertures therein having the configuration of numbers, which are adapted to receive raised numbers on a numbers tray.

The above, and other objects, features and advantages of the present invention will be apparent in the following detailed description of an illustrative embodiment thereof which is to be read in connection with the accompanying drawings, wherein:

FIG. 5 is a partial sectional view taken along line 5—5 of FIG. 1; and

FIG. 6 is a partial sectional elevational view of the numbers tray shown in FIG. 1.

Figure 1:
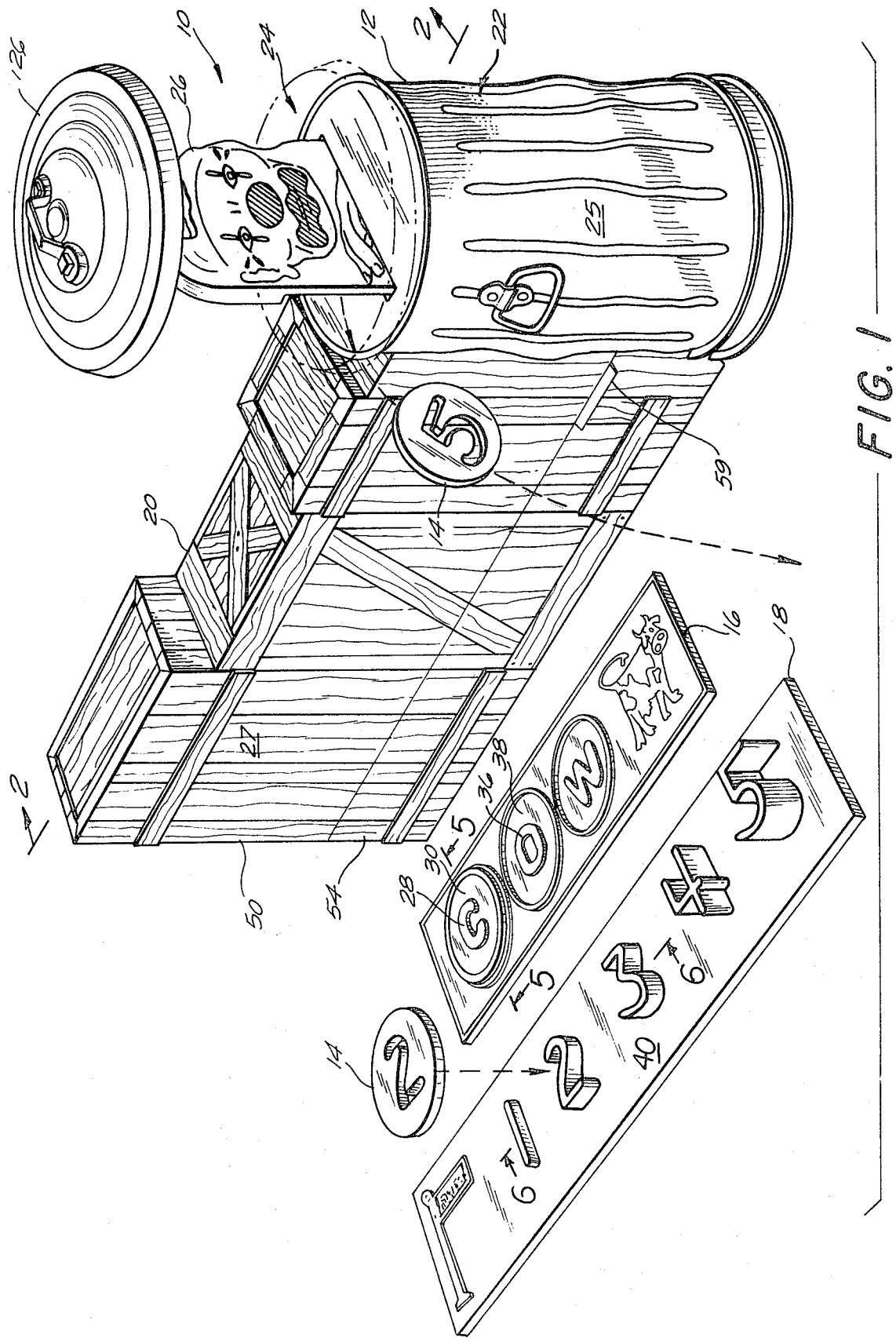
FIG. 1 is a perspective view of an educational toy constructed in accordance with one embodiment of the present invention.

Referring now to the drawing in detail and initially to FIG. 1 thereof, it will be seen that the educational toy 10 of the present invention includes a housing 12, a plurality of character disks 14, and one or more letter or number trays 16, 18 respectively. Housing 12 includes a storage section or station 20 in which a plurality of the character disks 14 are adapted to be stored in a stack. These disks are individually removed or dispensed from housing 12 at a dispensing station 22 which includes therein a dispensing mechanism 24 (see FIG. 2). The latter includes a slide plate 26 which will remove only a single disk from the housing at any one time, as is more fully described hereinafter.

In the illustrative embodiment of the present invention, slide or dispensing plate 26 is formed as a molded plastic article which may have the configuration of an animal or character formed on one face or side thereof. Housing or frame 12 is also formed as a molded plastic article, and, in the illustrative embodiment of the invention, defines a fanciful trash pail 25 at dispensing station 22 and associated storage crates 27 at storage station 20.

Preferably, the game of the present invention is played at any one time with only one set of character disks, i.e., either with the letters disks or the numbers disks with corresponding trays. As seen in FIG. 1, the character disks 14 generally are formed as circular plastic disks having the alphabet letters or Arabic numbers formed thereon. In the embodiment of the invention using letter disks, each disk has a single raised letter 28 on one side 30 thereof superimposed over a corresponding letter formed as a recess 32 on the opposite side 34 thereof (see FIG. 5). Each of the letter disks are provided with a different alphabet letter and thus are adapted to cooperate with one or more plastic letter trays 16 having words formed therein in conjunction with a picture or caricature representing the meaning of the word. For example, as seen in FIG. 1, the letter tray 16 is provided with the word "cow" formed thereon by raised letters 36 which are adapted to be received within corresponding recesses 32 of the proper letter disks 14. Tray 16 also includes a caricature of a cow, so as to provide an association between the meaning of the word formed by the child with the letter disks dispensed from housing 12. Preferably, letters 36 on trays 16 are located in circular recesses 38 which will retain the letter disks 14, as illustrated for the letter C in FIG. 1. By this construction, the game provides a self correcting or self teaching function for the child since the letter disks will not properly seat in recesses 38 unless the letter on the disk matches the letter on the tray. Thus, the child cannot misspell any word formed on the trays 16. In this regard, it is noted that even letters which have similar shapes cannot be inadvertently placed in the wrong recess, because each letter on the tray is designed so that only the same letter disk can be placed on it. For example, in the word "cow" shown in FIG. 1, the letter c is formed as a smooth curve, whereas the letter o is oval shaped and has flat sides. Thus, the c disk cannot be properly seated in the o recess and the o disk cannot be seated in the c recess. All of the letters used in this invention are similarly shaped for the same result.

In another embodiment of the present invention character disks 14 are provided with apertures extending therethrough having the configuration of the various Arabic numbers, for example, 1–5. In this embodiment of the invention, the game is provided with a numbers tray 18 having raised Arabic numbers formed thereon. Preferably, these Arabic numbers each have a different height, or thickness, above the upper surface 40 of tray 18, with each number having a height that is equal to the thickness of the number of number disks 14 it represents. Thus, the number 1 on tray 18 has a height which is equal to the thickness of a single number disk 14 (see FIG. 6), so that only one disk (having an aperture in the shape of a 1) can be placed thereon. On the other hand, the number 2 on plate 18 has a height which is equal to the thickness of two disks 14, so that two disks (having the number 2 formed therein as an aperture) can be placed upon the number 2 of the numbers tray. Similarly, the number 3 on numbers tray 18 has a height which which is equal to three disks 14 so that only three apertured numbered disks 14 (representing the number 3) can be placed thereon. The heights of the numbers 4 and 5 progress in the same manner on tray 18 and the tray also may be provided with higher numbers of greater height. Of course, the appropriate number of apertured disks are provided for each of the numbers used on tray 18.

The "numbers" embodiment of game 10 provides a relatively simple method for teaching children numbers concepts, i.e., teaching the child how many items of a particular type are represented by each individual number. Thus, the child can associate the number shown on the numbers tray with the physical number of disks which are equal to the number on the tray. This reduces numbers concepts to a very simple concept which is readily grasped by pre-school children.

Of course, it is to be understood that the disks and trays of the invention may be provided in other forms than letters and numbers. For example, the disks could be pieces of a puzzle and the trays the puzzle holder or matrix; the disk and trays could have words in lieu of letters or numbers; or the disks and trays may simply be color coded to provide a simple color matching game. Other variations of these concepts may also occur to those skilled in the art. Accordingly, the disks 14 are also referred to herein as disks or chips to encompass within both of those terms playing pieces of any type having letters or numbers formed thereon, being irregularly shaped or colored, etc., as may be used in the game of the present invention.

Referring again to FIG. 2 of the drawing, it is seen that storage station 20 includes an inclined ramp 42 having a generally semi-circular surface 44 which opens upwardly to receive a plurality of character disks or chips 14 in a stack therein. Ramp 42 has a central longitudinally extending slot 46 therein in which a disk pusher plate or member 48 is slidably mounted.

Figure 2:
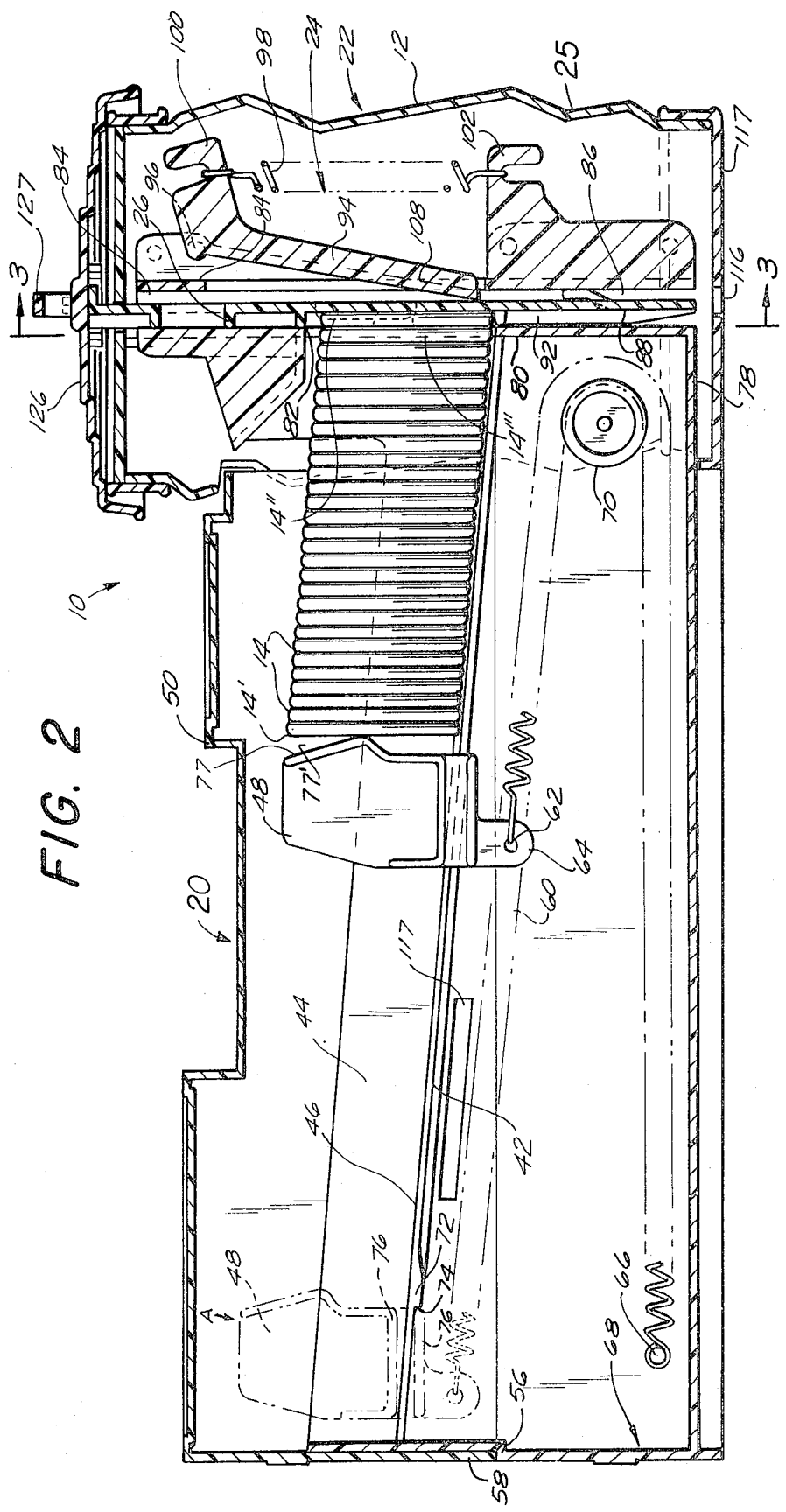
FIG. 2 is a side sectional view taken along line 2—2 of FIG. 1.

Storage station 20 is exposed for insertion of character disks 14 on ramp 42 by moving the upper portion 50 of storage crates 27 away from the storage station. The upper portion 50 of crates 27 is simply slidably removably mounted on the lower portion 54 thereof. As seen in FIG. 2, the lower portion 54 of the housing has a shoulder 56 on which the edges 58 of upper housing portion 50 are seated. Thus, the upper portion 50 of the housing can be conveniently removed, or slid back from, the trash pail portion 25, so as to expose ramp 42.

In order to load the game of the present invention, top 50 is slid back and pusher 48 is moved to the dotted line position shown in the left hand side of FIG. 2. The stack of disks 14 is then arranged in random sequence, on edge, along ramp 42 is position to be urged into dispensing station 22, by the puhser. The latter is biased towards the right in FIG. 2, i.e., towards the dispensing station by an elongated spring 60 which is secured at one end 62 to a tab 64 which is formed integrally with pusher 48 and which extends through slot 42. The opposite end 66 of spring 60 is secured in the lower portion 54 of housing 10, adjacent the rear wall 68 thereof. Spring 60 is guided about an interior annular guide member 70, located adjacent dispensing station 22. By this construction pusher 48 is brought as close as possible to dispensing station 22 as the chips 14 are dispensed therefrom. As a result, all of the chips or disks in the toy will be removed by the dispensing apparatus 24.

During loading of toy 10, pusher 48 is maintained in the dotted line position thereof shown in FIG. 2 by a pair of shoulder or abutment members 72 formed on the lower surface of the opposite halves of ramp 42, i.e., on opposite sides of slot 46. Shoulders 72 are adapted to engage the leading edge 74 of the pusher when the latter is in its dotted line position, thereby to prevent movement of the pusher under the influence of spring 60. By depressing pusher 48 downward slightly, in the direction of the arrow A, the leading edge 74 thereof is moved below shoulders 72 so that the shoulders will slide within the recesses 75 formed on opposite sides of pusher 48 (only one side of which is seen in FIG. 2) between the opposed laterally extending flanges 76. As a result, the pusher can pass abutments 72 and thus be moved into contact with the last disk 14' in the stack of disks on ramp 42. In this configuration, pusher 48, under the influence of spring 60, urges the forward-most disk 14'' into dispensing station 22.

Pusher 48 includes an upper inclined surface portion 77, as seen in FIG. 2, and which is located to define a space 77' between the pusher and the last disk 14' in the stack. By this construction, a child playing with the toy can add additional chips to the stack without moving pusher 48 to the left. That is, the child can simply insert one edge of the chip in space 77' and push it down towards ramp 42. Thus, the chip acts as a cam and forces pusher 48 back against the action of spring 60, to permit the new chip to be seated on the ramp. This feature of the the invention is advantageous since it eliminates the possibility of the stack of disks collapsing if pusher 48 were normally moved to the left to make room to add more disks to the stack. This clearly makes the toy easier for a small child to play with.

The forward portion 78 of housing section 54 extends into trash pail 25 at dispensing station 22 and includes a front wall 80 which extends vertically within dispensing station 22, perpendicularly to track 42. Wall 80 includes an aperture 82 therein through which disks 14 can move into the dispensing station. In addition, wall 80 cooperates with a second wall 84 mounted within the dispensing station 22 (i.e., trash pail 25) opposite wall 80, thereby to define a slot 86 between the two walls. Dispensing plate 26 is slidably mounted in slot 86 for movement from a first position, seen in FIG. 2, wherein the plate is contained entirely within trash pail 25, to a second position, seen in FIG. 4, wherein the plate is substantially fully withdrawn from pail 25, so as to discharge or dispense a character disk supported thereon.

Figure 3:
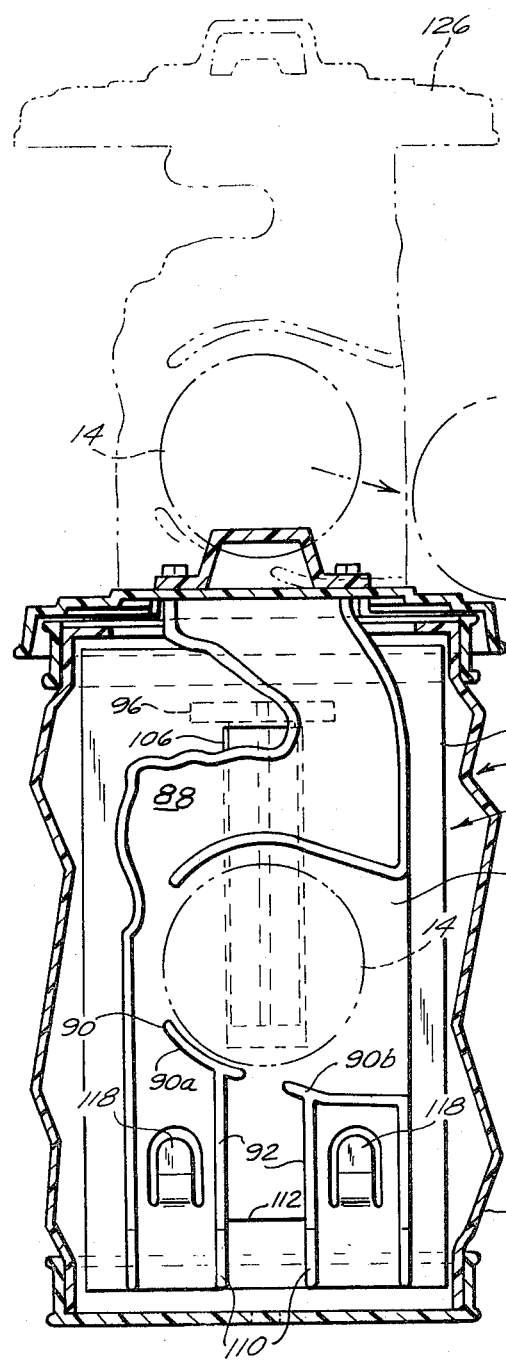
FIG. 3 is a sectional view taken along line 3—3 of FIG. 2.

Dispensing plate 26 includes on its back surface 88 a supporting lip 90 formed integrally therewith, but in two pieces 90a and 90b, as seen in FIG. 3. Lip 90 is located to be in axial alignment with ramp 42 when plate 26 is in its lowermost position, as seen in FIGS. 2 and 3. In that position, the forwardmost or leading disk 14" in the stack of disks on ramp 42 will be urged against plate 26 so that that disk will be supported on lip 90. As seen most clearly in FIG. 3, that lip is slightly inclined in one direction; thus upon upward movement of plate 26, to the dotted line position thereof seen in FIG. 3, the disk will fall from plate 26 under the influence of gravity, for use by the child in playing the game.

Figure 4:
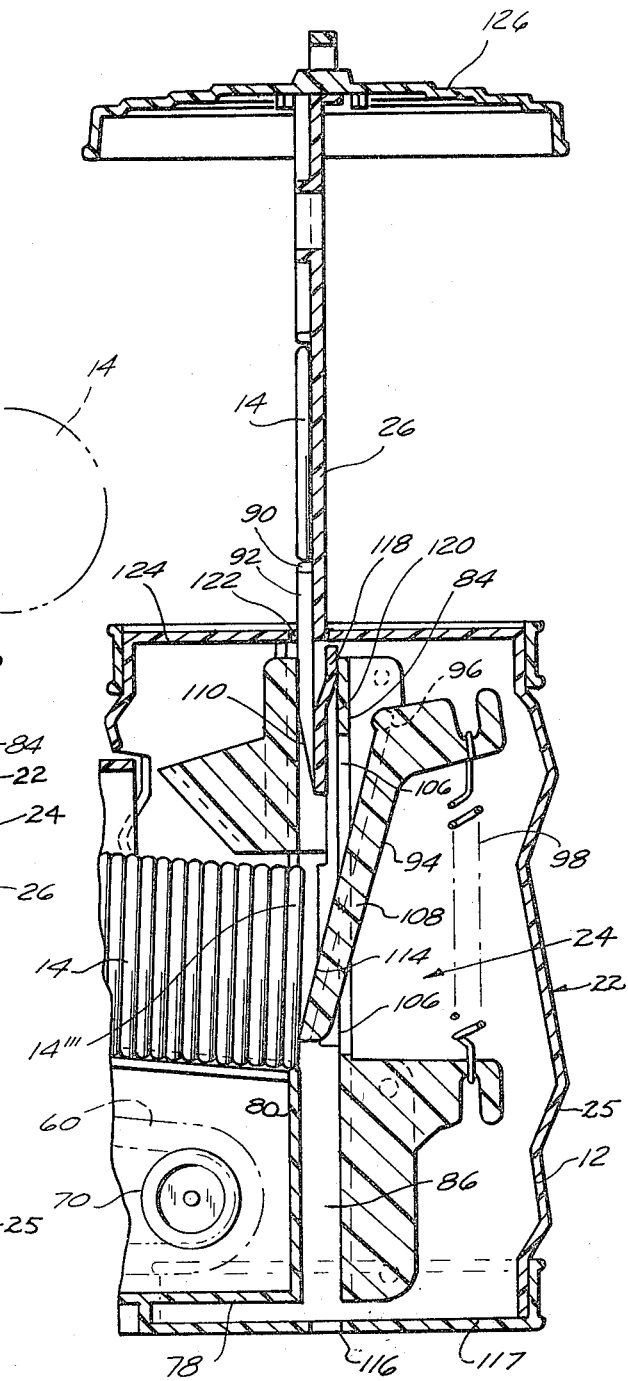
FIG. 4 is a partial side elevational view, similar to FIG. 2, showing the dispensing plate in its raised or dispensing position.

In order to prevent movement of disks 14 along ramp 42 during upward movement of plate 26, the plate is provided with vertically extending ribs 92 located below lip 90. These ribs, added to the thickness of plate 26, have substantially the same width as slot 86 so that upon upward movement of plate 26 they will engage the next disk, 14''', in the stack and prevent it from moving into slot 86. Due to the size limitations of plate 26 and trash pail 25, ribs 92 engage disk 14''' only during a portion of the movement of the plate. Thus, when plate 26 is fully extended, as seen in FIG. 4, ribs 92 are not in engagement with the disk 14'''. In order to still prevent movement of the stack of disks, after ribs 92 have passed the disks, an abutment member or lever 94 is provided which, as seen in FIG. 2, is of generally L-shaped configuration and is pivotally mounted at 96 on wall 84. Lever 94 is biased for pivotal movement in a counterclockwise direction, as seen in FIGS. 2 and 4, by a coiled tension spring 98 which is secured between leg 100 of lever 94 and a fixed support 102 secured to wall 84. The latter also includes a generally rectangular opening 106 therein through which leg 108 of lever 94 extends when plate 26 is moved towards its upper position.

Accordingly, it is seen that as plate 92 is moved towards its upper position (FIG. 4) leg 108 of lever 94 passes through aperture 106 and engages disk 14''', to prevent movement of the stack of disks on ramp 42 under the influence of pusher 48. Thus, slot 86 remains free to permit return of plate 26 to its lowermost position for receipt of the next disk thereon. It is noted that to permit troublefree return of plate 22 to its lowermost position, ribs 92 are tapered at their lower ends 110 and thus serve as cam surfaces which engage the top edge of disk 14''' during downward movement of the plate so that the plate can conveniently be returned to its downward position. In this regard, plate 26 is provided with a slot 112 which begins at the beginning of the taper 110 on ribs 92, so that, for example, during upward movement of the plate, lever 108 can extend through aperture 106 and into slot 112 so as to engage the disk 14''' as soon as taper 110 begins. Thus, disk 14''' is continuously held away from slot 86. Similarly, on return of plate 22 to its downward position the upper edge of slot 112 engages the surface 114 of leg 108 and causes lever 94 to pivot in a counterclockwise direction, against the bias of spring 98, while the ribs 92 prevent movement of the stack under the influence of the pusher 48 until lip 90 is in position in alignment with rail 42. In that position ribs 92 are out of engagement with disk 14''' and the stack of disks is free to move to the right, under the influence of pusher 48, so that the leading disk 14''' is urged onto lip 90 for support thereon. Thus, that disk can then be removed from the dispensing station in the manner previously described.

It is noted that trash pail 25 includes a slot 116 in the base 117 thereof, located directly below slot 86. This slot permits relatively simple removal of any disk 14 which should inadvertently enter slot 86 when plate 26 is in its uppermost position. This could occur, for example, by a child manually forcing the stack of disks against spring loaded lever 94, thereby causing the lever to pivot in a counterclockwise direction and permitting the leading most disk 14''' to enter slot 86. The provision of slot 116 avoids disassembling the device in order to remove a disk which entered slot 86. Similarly, one of the side walls of storage station 20 may be provided with an elongated slot 117, as seen in FIG. 2, to permit removal of any chips which may inadvertently pass through slot 46 in ramp 42 into the area below the ramp.

In addition, plate 26 is provided with a pair of guide feet 118 formed adjacent the lower edge thereof. These feet slide along the surface 120 of plate 84 during movement of plate 26 to maintain the latter in close fitting engagement with the surfaces of the walls 80 and 84 so as to eliminate any wobbling movement of the plate during sliding. In addition, these feet serve as stop members which prevent removal of plate 26 through the slot 122 in the top 124 of pail 25. Of course, downward movement of plate 26 is limited by the engagement of the pail cover 126 with the upper surface of the trash pail housing. As shown in the drawing, cover 126 is secured to character or plate 26 and has a handle 127 which is used to raise and lower the plate 26.

Accordingly, it is seen that a relatively simple and inexpensively constructed toy device is provided which is adapted to randomly supply individual character chips to a child for use with character number or letter trays that serve to teach the child the alphabet letters, the spelling of basic words, and numbers concepts. Moreover, the number trays and disks provide a simple educational method of teaching children numbers concepts by relating the numbers on the tray to equivalent physical numbers of disks removed from the toy housing.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A toy comprising a plurality of chips having distinguishing characteristics and a dispenser for said chips comprising, a frame having a chip storage station and a chip dispensing station, means at said storage station for supporting a plurality of individual chips in an aligned stack; means at said dispensing station for removing individual chips from said stack and discharging them from said frame, and at least one cooperating tray having distinguishing characteristics which are complementary to the distinguishing characteristics of said chips, whereby said chips are adapted to be randomly placed in said storage station and dispensed therefrom by said removing means for placement in predetermined locations on said tray; said tray comprising a number tray having a plurality of raised numbers formed thereon, said chips having apertures formed therein defining numbers adapted to receive corresponding raised numbers on said tray, said raised numbers having different heights, with each raised number having a height corresponding to the thickness of the number of chips it represents.

2. A toy comprising a plurality of chips having distinguishing characteristics, and including peripheral edges, and a dispenser for said chips comprising a frame having a chip storage station and a chip dispensing station, said storage station including a chip storage ramp adapted to support a plurality of individual chips in an aligned stack on their peripheral edges, and means for biasing said stack along said ramp towards said dispensing station;

said dispensing station including a dispensing plate located adjacent one end of said ramp and having support means thereon located generally in alignment with said ramp for receiving the leading chip in said stack, said leading chip being urged onto said supporting means under the influence of said biasing means, said plate being slidably mounted in said frame for movement from a first position wherein said support means is adjacent said ramp and a second position wherein said support means is located outside of said frame, whereby an individual chip located in said support means is removed from said stack and dispensed from said frame;

means in said frame for preventing movement of said stack towards said dispensing station under the influence of said biasing means when the plate is not in said first position, including an abutment member movably mounted in the frame on the side of the plate opposite said support means, and means for biasing said abutment means towards said storage station, said abutment means being urged into contact with the first chip in said stack upon movement of said plate out of said first position, said plate and abutment means having cooperating surfaces for moving said abutment means away from said stack as said plate is returned to said first position; and at least one cooperating tray having distinguishing characteristics which are complementary to the distinguishing characteristics of said chips, whereby said chips are adapted to be randomly placed on said storage station and dispensed therefrom by said dispensing plate for placement in predetermined locations on said tray.

3. The toy as defined in claim 2 wherein said support means comprises an outwardly extending lip formed on the side of said plate facing said ramp.

4. The toy as defined in claim 3 including at least one rib formed on said plate below said lip for engaging the first chip in said stack as said plate is moved towards said second position, thereby to prevent movement of said chip into said dispensing station during movement of said plate to its second position.

5. The toy as defined in claim 2 wherein said abutment means comprises a lever pivotally mounted in said frame, and said means biasing said abutment means comprise a spring operatively connected between said frame and said lever for biasing one end of said lever towards said storage station.

6. The toy as defined in claim 2 wherein said means for biasing said stack comprises a pusher element slidably mounted on said ramp and spring means for urging said pusher towards said dispensing station.

7. The toy as defined in claim 6 wherein said spring means comprises an elongated coil spring secured at one end to said pusher, and at its other end to said frame adjacent the end of said ramp remote from said dispensing station, said fame including a spring guide member adjacent said dispensing station, and said spring being trained over said guide between its ends whereby said pusher is adapted to be moved to the end of said ram adjacent said dispensing station by said spring.

8. The toy as defined in claim 6 wherein said pusher adn said ramp have at least one pair of cooperating surfaces formed thereon for preventing movement of said pusher at a predetermined location along said ramp.

9. A toy comprising a plurality of chips having distinguishing characteristics and including peripheral edges, and a dispenser for said chips comprising a frame having a chip storage station and a chip dispensing station, said storage station including a chip storage ramp adapted to support a plurality of individual chips in an aligned stack on their peripheral edges, and means for biasing said stack along said ramp towards said dispensing station;

said dispensing station including a dispensing plate located adjacent one end of said ramp and having support means thereon located generally in alignment with said ramp for receiving the leading chip in said stack, said leading chip being urged onto said supporting means under the influence of said biasing means, said plate being slidably mounted in said frame for movement from a first position wherein said support means is adjacent said ramp and a second position wherein said support means is located outside of said frame, whereby an individual chip located on said support means is removed from said stack and dispensed from said frame;

means in said frame for preventing movement of said stack towards said dispensing station under the influence of said biasing means when said plate is not in said first position; and at least one cooperating tray having distinguishing characteristics which are complementary to the distinguishing characteristics of said chips, whereby said chips are adapted to be randomly placed on said storage station and dispensed therefrom by said dispensing plate for placement in predetermined locations in said tray; said tray comprising a letter tray having raised letters formed thereon; said chips having different recessed letters formed thereon, and being adapted to be placed on said ramp and dispensed therefrom by said plate for placement on corresponding letters on said tray.

10. A toy comprising a plurality of chips having distinguishing characteristics and including peripheral edges, and a dispenser for said chips comprising a frame having a chip storage station and a chip dispensing station, said storage station including a chip storage ramp adapted to support a plurality of individual chips in an aligned stack on their peripheral edges, and means for biasing said stack along said ramp towards said dispensing station;

said dispensing station including a dispensing plate located adjacent one end of said ramp and having support means thereon located generally in alignment with said ramp for receiving the leading chip in said stack, said loading chip being urged onto said supporting means under the influence of said biasing means, said plate being slidably mounted in said frame for movement from a first position wherein said support means is adjacent said ramp and a second position wherein said support means is located outside of said frame, whereby an individual chip located on said support means is removed from said stack and dispensed from said frame; and at least one cooperating tray having distinguishing characteristics which are complementary to the distinguishing characteristics of said chips, whreby said chips are adapted to be randomly placed whereby said storage station and dispensed therefrom by said dispensing plate for placement in predetermined locations on said tray; said tray comprising a number tray having a plurality of raised numbers formed thereon, and a plurality of said chips having apertures formed therein defining numbers adapted to receive corresponding raised numbers on said tray, said raised numbers having different heights, with said raised numbers having a height corresponding to the thickness of the number of chips it represents, said chips being adapted to be placed on said ramp and dispensed therefrom by said plate for placement on corresponding numbers on said number tray.

11. A toy comprising a plurality of chips having distinguishing characteristics and including peripheral edges, and a dispenser for said chips comprising a frame having a chip storage station and a chip dispensing station, said storage station including a chip storage ramp adapted to support a plurality of individual chips in an aligned stack on their peripheral edges, and means for biasing said stack along said ramp towards said dispensing station;

said dispensing station including a dispensing plate located adjacent one end of said ramp and having support means thereon located generally in alignment with said ramp for receiving the leading chip in said stack, said leading chip being urged onto said supporting means under the influence of said biasing means, said plate being slidably mounted in said frame for movement from a first position wherein said support means is adjacent said ramp and a second position wherein said support means is located outside of said frame, whereby an individual chip located on said support means is removed from said stack and dispensed from said frame; and at least one cooperating tray having distinguishing characteristics which are complementary to the distinguishing characteristics of said chips, whereby said chips are adapted to be randomly placed in said storage station and dispensed therefrom by said dispensing plate for placement in predetermined locations on said tray;

said biasing means including a pusher element slidably mounted on said ramp and spring means for urging said pusher towards said dispensing station; said pusher having an inclined surface formed thereon extending upwardly and away from the last chip in said stack thereby to permit insertion of an additional chip into said stack adjacent said pusher without manually moving the pusher.

12. A toy comprising a plurality of character containing disks having peripheral edges and a dispenser therefor, said dispenser comprising a frame having a disk storage station and a disk dispensing station, said storage station including a disk storage ramp formed in said frame and adapted to support a plurality of individual character disks in an aligned stack on their edges, a pusher slidably mounted on said ramp, and first spring means for biasing said pusher along said ramp towards said dispensing station to urge said stack towards said station;

said dispensing station including a disk dispensing plate slidably mounted in said frame adjacent one end of said ramp, said plate having a disk support lip formed on one side thereof and normally located in alignment with same ramp for receiving and supporting said first disk in said stack, said first disk being urged onto said lip under the influence of said spring means, said plate being slidable from a first position wherein said lip is in alignment with said ramp to a second position wherein said lip is located outside said frame, whereby said first disk is removed from said stack by said plate and dispensed from said frame;

means in said frame for preventing movement of said stack towards said dispensing station under the influence of said first spring means when said plate is not in said first position, including at least one rib formed on said plate below said lip for engaging the first disk in said stack as said plate is moved towards said second position to prevent movement of said stack towards said dispensing station until the bottom edge of said plate passes said ramp, a movable abutment member movably mounted in said frame on the side of said plate opposite said lip and second spring means normally biasing said abutment member towards said ramp, said abutment member being moved into contact with the first disk in the stack on said ramp by said second spring means as the bottom edge of said plate moves past said ramp, whereby said rib and abutment means cooperate to prevent a disk from entering said dispensing station when said plate is out of said first position, said plate and abutment member having cooperating surfaces for moving said abutment member away from said stack of disks as said plate is returned to said first position; and at least one cooperating tray having characters formed thereon which are complementary to the characters of said disk, whereby said disks are adapted to be randomly placed in said storage station and dispensed therefrom by said dispensing plate for placement in predetermined locations on said tray.

13. The toy as defined in claimm 12 wherein the lowermost portion of said rib is tapered towards said lower edge of said plate and defines a cam surface for engaging the first disk in said stack as said plate is returned to said first position, said plate having a slot therein extending from said lower edge to the location of the beginning of said tapered rib portion, and said abutment member being located to extend through said slot.

14. The toy as defined in claim 13 wherein said abutment member comprises a lever pivotally mounted in said frame and having a leg portion adapted to extend through said slot.

15. The toy as defined in claim 12 wherein said means for biasing said stack comprises a pusher element slidably mounted on said ramp and spring means for urging said pusher towards said dispensing station.

16. The toy as defined in claim 15 wherein said first spring means comprises an elongated coil spring secured at one end to said pusher, and at its other end to said frame adjacent the end of said ramp remote from said dispensing station, said frame including a spring guide member adjacent said dispensing station, and said first spring means being trained over said guide between its ends whereby said pusher is adapted to be moved to the end of said ram adjacent said dispensing station by said first spring means.

17. The toy as defined in claim 15 wherein said pusher and said ramp have at least one pair of cooperating surfaces formed thereon for preventing movement of said pusher at a predetermined location along said ramp.

* * * * *